United States Patent [19]

Bentley et al.

[11] Patent Number: 4,860,193
[45] Date of Patent: Aug. 22, 1989

[54] SYSTEM FOR EFFICIENTLY TRANSFERRING DATA BETWEEN A HIGH SPEED CHANNEL AND A LOW SPEED I/O DEVICE

[75] Inventors: Steven R. Bentley; David M. Fickle; Pamela R. Nylander-Hill, all of Tucson, Ariz.

[73] Assignee: International Business Machines Corporation, Armonk, N.Y.

[21] Appl. No.: 865,982

[22] Filed: May 22, 1986

[51] Int. Cl.$^4$ .............. G06F 3/00; G06F 13/12; G06F 13/14
[52] U.S. Cl. .................................. 364/200
[58] Field of Search ... 364/200 MS File, 900 MS File

[56] References Cited

U.S. PATENT DOCUMENTS

| | | | |
|---|---|---|---|
| 3,411,142 | 11/1968 | Lee et al. | 340/172.5 |
| 3,566,090 | 2/1971 | Johnson | 235/92 |
| 3,836,891 | 9/1974 | McDaniel | 364/900 |
| 4,040,027 | 8/1977 | van Es et al. | 364/900 |
| 4,125,870 | 11/1978 | Suzuki et al. | 364/900 |
| 4,258,418 | 3/1981 | Heath | 364/200 |
| 4,435,762 | 3/1984 | Milligan et al. | 364/200 |
| 4,484,275 | 11/1984 | Katzman et al. | 364/200 |
| 4,494,196 | 1/1985 | Greer | 364/200 |
| 4,602,331 | 7/1986 | Sheth | 364/200 |
| 4,644,463 | 2/1987 | Hotchkin et al. | 364/200 |
| 4,649,512 | 3/1987 | Nakiyama | 364/900 |

OTHER PUBLICATIONS

Brochure "4500 Tape Subsystem" Technical Data, Mar. 1982, Storage Technology Corporation.

Primary Examiner—Archie E. Williams, Jr.
Assistant Examiner—Leo Li Wang
Attorney, Agent, or Firm—Pollock, Vande Sande & Priddy

[57] ABSTRACT

A buffer memory is used to store data from the input-/output device arrayed corresponding to the data rate of said input/output data device. A threshold is selected for beginnig an unload cycle of the buffer memory which will permit said buffer memory contents to be completely transferred at the higher channel data rate to the channel during the remaining time additional data is being accumulated in the memory. The threshold selection is adaptive such that subsequent data block lengths are utilized to calculate a new threshold maintaining data transfer rates from the input/output device into the channel at an optimum value.

4 Claims, 5 Drawing Sheets

| ACTUAL LENGTH REGISTER | | | | | | THRESHOLD (BYTE NO.) |
|---|---|---|---|---|---|---|
| 0 | 0 | 0 | 0 | 0 | 0 | 0 |
| 0 | 0 | 0 | 0 | 0 | 1 | 0 |
| 0 | 0 | 0 | 0 | 1 | 0 | 1 K BYTES |
| 0 | 0 | 0 | 1 | 1 | 0 | 3 K BYTES |
| 0 | 1 | 0 | 0 | 0 | 1 | 10 K BYTES |
| 1 | 0 | 0 | 0 | 0 | 1 | 20 K BYTES |
| 1 | 1 | 1 | 1 | 1 | 1 | 38 K BYTES |

FIG. 5

SYSTEM FOR EFFICIENTLY TRANSFERRING DATA BETWEEN A HIGH SPEED CHANNEL AND A LOW SPEED I/O DEVICE

The present invention relates to data buffered devices for controlling the transfer of data between an input/output device and a high speed data channel. Specifically, a technique for maintaining channel capacity with a minimum of input/output device degradation is provided.

Data processing systems are exemplified by a host processor which can manipulate, format and execute arithmetic operations on data received from an input/output device. Tape readers, disc readers and other peripheral sources of data are generally more limited in their capacity to transfer data than the host processor and the channel connecting the host processor to the input/output device. Speed matching buffers are typically employed to match the device data transfer rate to the channel data transfer rate.

In prior art buffer devices, effort is made to preserve the channel data transfer rate to permit maximum channel utilization to serve a plurality of input/output devices. This goal can be achieved by first writing the input/output device data into a buffer memory at the input/output device data transfer rate. When the channel is ready to receive the input/output device data, the buffer memory contents are read onto the channel at the channel data transfer rate.

Such techniques, while preserving channel capacity and data transfer capabilities, degrade input/output device performance. The time required to write the buffer memory with device data, and then to read the memory contents, can be greater than the time required if the device is connected to directly transfer data to the data channel.

In one technique described in U.S. Pat. No. 4,258,418, a buffer is described having a threshold which identifies the buffer memory capacity level at which the READ operation is to commence. The READ operation will begin before the WRITE operation is completed. The threshold is selected to avoid exceeding the capacity of the buffer without regard to input/output device data transfer degradation. The buffer memory is written and read such as to maintain the buffer storage level at a predetermined fraction of the total storage capacity.

The present invention is directed to determining an appropriate threshold which will maintain channel data transfer rates while minimizing the degradation to input/output device performance.

SUMMARY OF THE INVENTION

It is an object of this invention to provide for efficient data buffering between an input/output device and a data channel.

It is a more specific object of this invention to provide an adaptive LOAD/UNLOAD threshold for identifying the optimum time to begin transferring data from a data buffer memory to a connected data channel. LOAD is defined as the transfer of data into a data buffer and UNLOAD is defined as the transfer of data out of the buffer.

These and other objects of the invention are obtained by providing an apparatus and method which selects a data transfer threshold based upon the length of one or more previously transferred data blocks. The technique is adaptive, selecting a new threshold for subsequent data blocks based upon the length of previously transferred data blocks. Each new threshold is selected which will identify the beginning of a data transfer from a buffer memory to the channel. The threshold is selected to transfer the buffer data to the channel during the time required to write the remaining device data to the buffer memory. The selection of the threshold in accordance with the invention permits the buffer memory to be unloaded at the higher channel speed before the complete data block has been transferred to the memory. The buffer memory load time will overlap the unload time of the channel with both load and unload times ending at substantially the same time.

The readout threshold value is determined in a preferred embodiment of the invention based upon the length of the longest of the previous blocks of data received from the input/output device, C actual; the maximum channel data rate Rc; and the average device data rate Rd, as $$C \text{ threshold} = C \text{ actual} \times \frac{Rc - Rd}{Rc}$$

The new threshold identifies a byte of the next consecutive block of data bytes to be loaded in the buffer memory. When this byte is received by the buffer memory, the buffer unload cycle will begin. The buffer load and unload cycles are conducted simultaneously and will end at substantially the same time.

DESCRIPTION OF THE FIGURES

FIG. 5 is a lookup table for decoding a new threshold byte number from the actual length register.

DESCRIPTION OF THE PREFERRED EMBODIMENT

Figure 1:
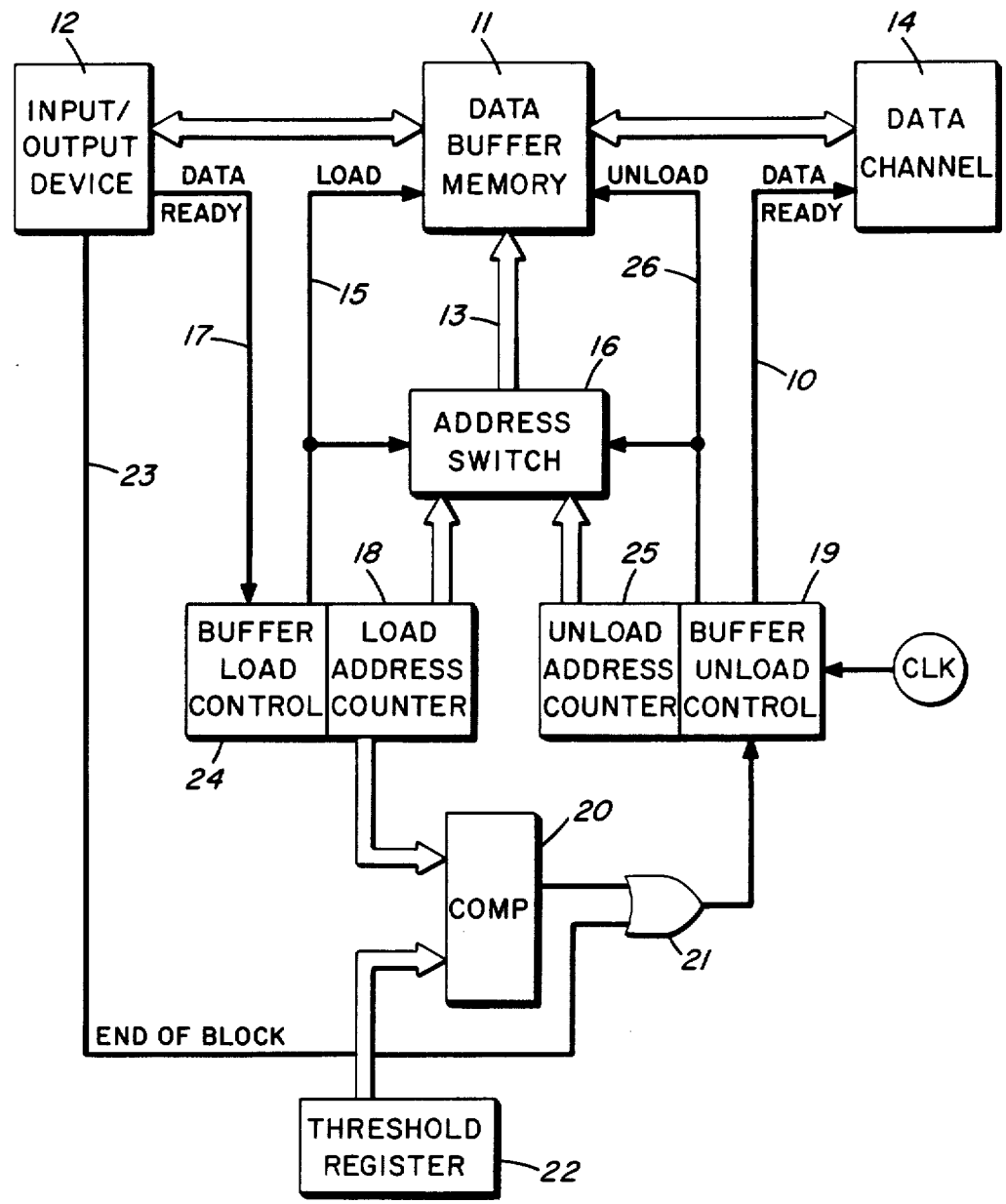
FIG. 1 illustrates the architecture of the buffer device incorporating the present invention.

Referring now to FIG. 1, there is shown a block diagram which conceptually illustrates the transfer of data from an input/output device 12 to a high speed data channel 14. The architecture of FIG. 1 is representative of data buffering techniques which permit the slower speed data input/output device 12 to transfer data to the higher speed channel 14. A data buffer memory 11 is used to store at least a portion of a data block or data file being read from the input/output device 12. Input/output device 12 may be a tape reader, disc reader or other source for supplying data organized as blocks of data bytes.

During reading of data bytes from input/output device 12, a buffer load control 24 will advance a load address counter 18 each time a new data byte is presented for loading in data buffer memory 11, as indicated by data ready 17. The new load address of load address counter 18 will be presented by switch 16 through an address bus 13 to the data buffer memory 11, and the load operation activated by load 15. Thus, each sequentially received data byte is stored at a new subsequent data buffer memory location as defined by the load address counter 18.

When a particular threshold is reached corresponding to a unique number of data bytes which have been stored in data buffer memory 11, comparator 20 will apply a logic signal through OR gate 21 to buffer unload control 19. This threshold, as identified by threshold register 22, will mark the beginning of the unloading of data buffer memory 11 to the channel 14.

The buffer unload control 19 will have initialized the unload address counter 25. The unload address counter is connected to the switch 16. Upon the threshold compare, the unload address is switched to memory address bus 13 by UNLOAD 26 and data ready 10 is supplied to data channel 14. The buffer unload control 19 operates at a higher rate than but not simultaneously with the buffer load control 24. Thus, before completing storage of the entire data block received from input/output device 12, the data buffer memory 11 begins an UNLOAD cycle to transfer data to channel 14.

OR gate 21 combines an END OF BLOCK signal from line 23 of the input/output device 12 with the comparator 20 output. In the event that the number of bytes in a block of data being read from input/output device 12 is less than the number indicated by threshold register 22, this condition will initiate the UNLOAD operation of data buffer memory 11.

Figure 2:
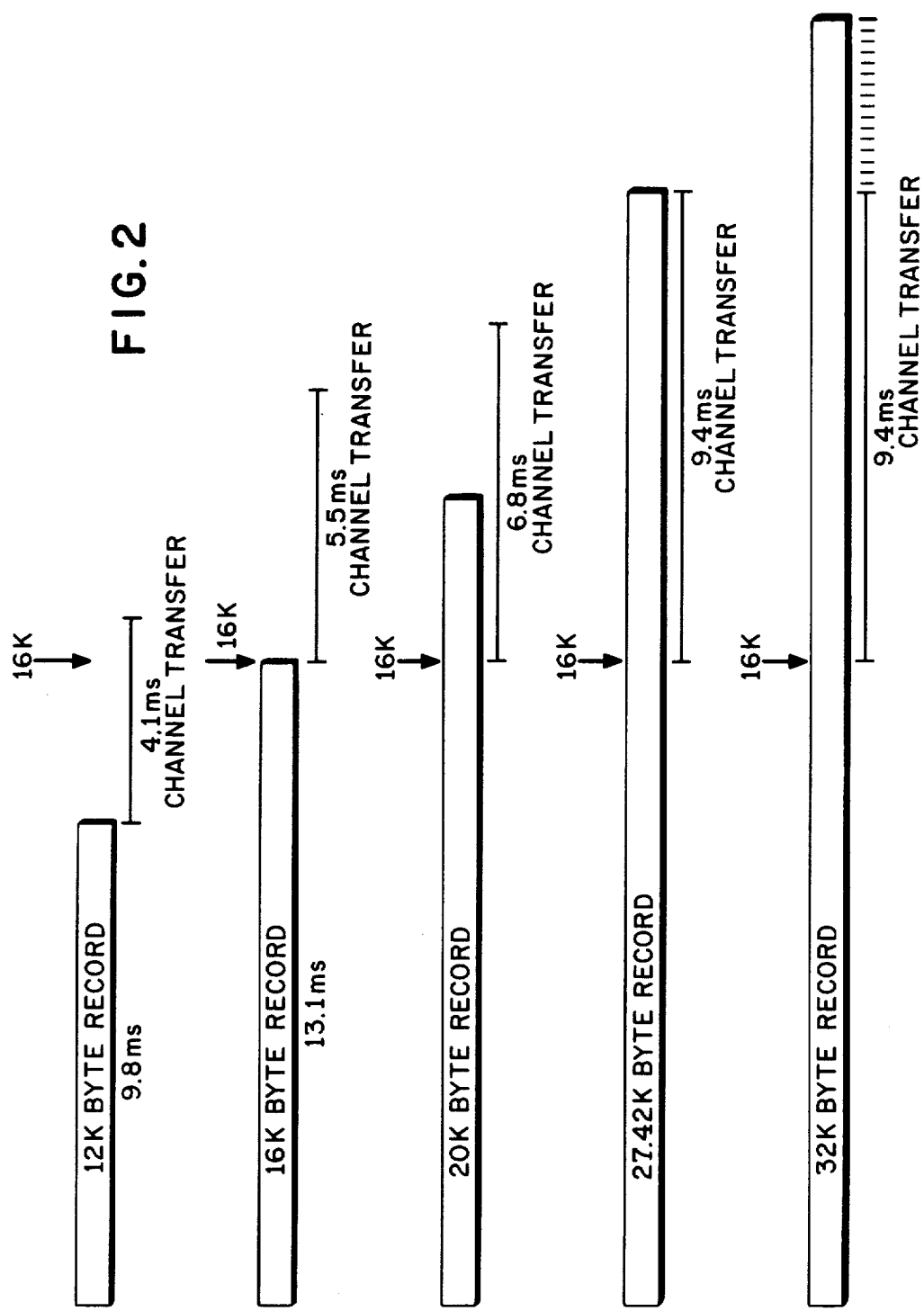
FIG. 2 illustrates the effects of a data transfer threshold on input/output device efficiency and channel transfer efficiency.

The effects of selecting an appropriate threshold for beginning the UNLOAD cycle, which occurs simultaneously with a remaining portion of the LOAD cycle of data buffer 11 can be seen by referring to FIG. 2. FIG. 2 illustrates, as a rectangle, five (5) different block sizes, or record sizes, containing 12K, 16K, 20K, 27.42K and 32K bytes. The examples of FIG. 2 assume a threshold of 16K bytes, wherein at least 16K bytes must be accumulated in data buffer memory 11 before the UNLOAD cycle is initiated. It is assumed in this example that an optimum readout time of 9.4 milliseconds is targeted for the block of data.

The first of the examples shown in FIG. 2 of a 12K byte record is transferred from the input/output device 12 to the memory 11 in 9.8 milliseconds. This corresponds to a data rate for the input/output device 12 of 1.25 megabytes per second. It is clear that the threshold of 16K bytes for that particular record cannot be achieved since there are only a total of 12K bytes available, the end of block signal 23 of FIG. 1 will initiate a UNLOAD cycle from the data buffer memory 11. A channel 14, having a data channel rate of 2½ times the input/output device data rate 12 will take 4.1 milliseconds to transfer the entire data block to the channel 14.

The 16K byte record shown in FIG. 2 requires 13.1 milliseconds to be completely transferred to the data buffer memory 11. The threshold 16K, having been met, will initiate a channel transfer which will take place in 5.5 milliseconds.

The 20K byte record using the 16K threshold level will initiate an UNLOAD cycle of data buffer memory 11 when the 16K byte of the total 20K byte record has been stored in data buffer memory 11. As shown in FIG. 2, there is overlap between the last portion of the LOAD cycle for accumulating data in data buffer 11, and the UNLOAD cycle, wherein data transfer from the data buffer memory 11 begins before the LOAD cycle is completed.

The foregoing three examples show the effect of threshold selection by threshold register 22 with respect to the device performance. It is seen from each of these figures that it takes additional time to transfer the entire data block of each of these examples to the channel. Thus, the total data transfer time includes that portion necessary to load the data block to data buffer memory 11, and the remaining amount of time required to unload the data from the data buffer memory 11 to the channel 14. The input/output device 12 suffers data transfer rate degradation because of the additional channel transfer time.

Selection of an appropriate threshold for a threshold register 22 which will optimize channel data transfer time, and the input/output device 12 data rate transfer is shown with respect to the 27.42K byte record of FIG. 2. Here the 16K byte threshold, when reached, will initiate a channel transfer which is concluded at the same time that the last byte of the input/output device 12 for this data record is transferred to the data buffer memory 11. Thus, no additional time is required for making the data transfer from the data buffer memory 11 to the channel 14 as a result of buffering the data in data buffer 11. The channel is only needed for that precise amount of time, 9.4 milliseconds dedicated to service the input/output device, to transfer the data from data buffer memory 11 at the higher channel rate.

The effect of selecting a threshold for threshold register 22 which is smaller than desired is shown by the 32K byte record of FIG. 2. It is clear that with the 16K byte threshold, after connection to the channel 14, the optimum 9.4 millisecond channel transfer time, the time deemed appropriate as a target for the channel to unload the anticipated data block, is insufficient to transfer the 32K byte record. After 9.4 milliseconds, the data buffer memory has been depleted to zero contents and additional data for transfer to the channel 14 is not available in the data buffer memory 11. At this time, it is necessary to slow the channel clock or a clock synchronized with the channel clock to the data transfer rate of the input/output device 12. This latter slower clock rate will theoretically have to be no greater than the input/output device 12 data rate. Thus, the channel transfer efficiency suffers with the 32K byte record as all the data cannot be transferred at the maximum channel data rate within the 9.4 millisecond target.

The foregoing five examples of data byte records show the effect of threshold vale on device performance and channel performance. The first three examples of 12K, 16K and 20K demonstrate how the device transfer rate is degraded, while the 32K byte rate illustrates how channel transfer rate is degraded by an improper selection of the threshold. The example of the 27.42K byte record illustrates optimum device transfer rate, while preserving channel transfer rate. The channel transfer time of 9.4 milliseconds occurs within the time needed to load the input/output device 12 data for the entire data block.

From observing the foregoing, an optimum threshold can be determined, C threshold, by observing the previous data block. As occurs in many data processing applications, data block length sizes tend to an average data block length. Thus, from examining previously received lengths of data blocks, a threshold can be established as $$C \text{ threshold} = C \text{ actual} \times \frac{Rc - Rd}{Rc}$$

where Rc is the channel data transfer rate, Rd is the device data transfer rate.

The new threshold identifies an expected byte length for the next consecutive block of data bytes to be loaded in the memory. Subsequent data block lengths, C actual, are monitored and the threshold, C threshold is updated based upon these subsequent block lengths.

In the preferred embodiment of the invention, the longest of the five consecutive data blocks is utilized as the C actual value for determining the new C threshold level. Obviously, in other data processing systems, other criteria can be established such as the average of a number of subsequent data block lengths or some statistical weighing technique.

Figure 3:
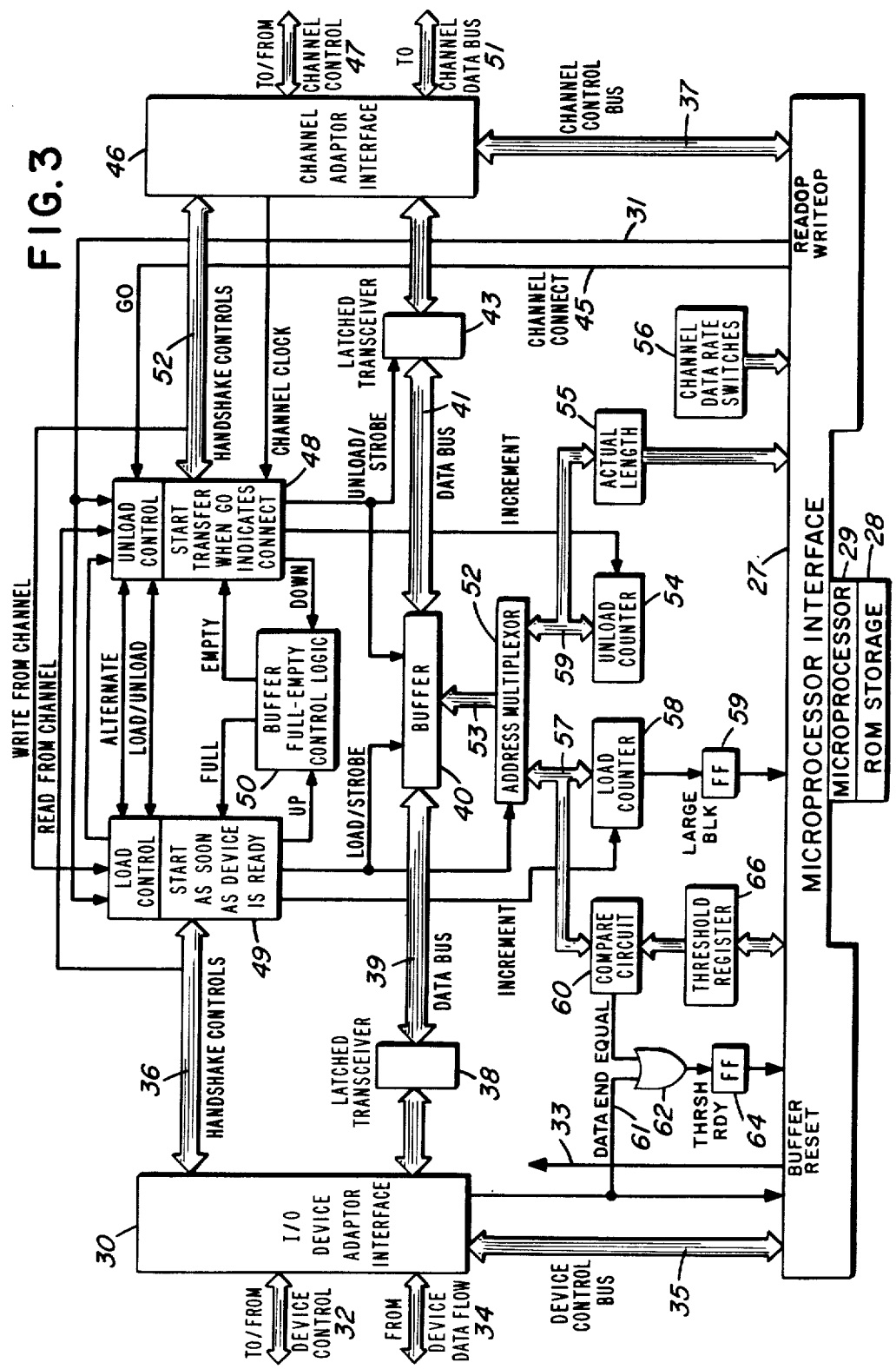
FIG. 3 is a block diagram illustrating a data buffer in accordance with a preferred embodiment of the invention.

Referring now to FIG. 3, a specific embodiment of the invention for effecting data transfer between a higher speed channel data bus 51 and a lower speed input/output device data bus 34 is shown. The architecture of the buffer of FIG. 3 will permit data transfer in both directions, i.e., from the input/output device to the channel data bus and from the channel data bus to the input/output device. However, as the invention's applicability is greatest in transferring data from the lower speed input/output device to the higher speed channel data bus, the discussion will necessarily focus on this aspect of the operation of FIG. 3, initiated by a channel read command.

A data buffer RAM 40 is shown which may be a 64K × 8 random access memory. The data buffer RAM 40 has two multiplexed data buses 41 and 39 for transferring data to the channel adapter interface 46 and input/output device adapter interface 30. Each of these data buses 39, 41 include an appropriate transceiver 38 and 43 for holding data received from either the input-/output device adapter interface 30 or the channel adapter interface 46.

The load control 49 will appropriately index a load counter 58 as well as develop a load strobe when the data is present for writing in the data buffer RAM 40. When considering the case of transferring data from the input/output device to the data buffer RAM, the load control 49 is operated from signals received from handshake controls 36. The handshake controls 36 are a common protocol which will identify the fact that a data byte has been produced by the I/O device adapter interface 30 for writing in the data buffer RAM 40, and permit a load strobe to be generated. When a data byte is received from the input/output device on the appropriate data bus 34, and a control command from the device on control bus 32 requests transfer of the data ultimately to the channel data bus 51, the handshake controls 36 will identify the presence of a data byte on data bus 34 which is latched in transceiver 38. As soon as the handshake controls indicate the data byte is latched in transceiver 38, the data buffer RAM 40 will be strobed by a load strobe pulse. The transferred data from device data bus 34 is loaded into an address identified by the load counter 58, and supplied to the address multiplexer 52. The address multiplexer 52 provides the address in response to a LOAD/STROBE on the data buffer RAM address bus 53. After the byte is loaded, the load counter 58 is incremented.

An unload control 48 is provided which will begin transfer of data written in the data buffer RAM 40. The unload control 48 will, when a threshold has been reached, as identified by the contents of threshold register 66, begin unloading the data in data buffer RAM 40 to data bus 41. The unload control 48 will begin unloading data buffer RAM 40 when the CHANNEL CONNECT line 45 is enabled, indicating the channel has been acquired and is ready for data transfer. Data unloaded from data bus 41 will be latched in the transceiver 43 for transfer to the channel adapter interface 46. An unload strobe is generated to latch the data byte into transceiver 43, and then the unload counter 54 is incremented to a new address indicating a subsequent data byte to be transferred from the data buffer RAM 40 to the channel data bus 51. The unload control 48 and load control 49 will time share the address multiplexer 52, such that the unloading sequence of the data buffer RAM 40 will occur alternately with writing sequence to the data buffer RAM 40. The channel clock will determine the data UNLOAD transfer rate.

A buffer full-empty control logic circuit 50 will keep track of the contents of the data buffer RAM 40. In the event the data buffer RAM 40 is written to its capacity, the load control will generate a halt for the handshake controls 36. In this way, the buffer is not overwritten.

Similarly, if the data buffer RAM 40 is completely unloaded of its contents, an INHIBIT will be generated by the unload control 48 until more data accumulates in the data buffer RAM 40. During this time, unloading transfer rate is lowered to accommodate the slower data transfer from the input/output device to the buffer RAM 40.

The threshold register 66 receives a threshold byte to identify the device data byte number for which the unload control is to be enabled. The threshold register 66 can be loaded with a default value when the channel data buffer is initially enabled. The subsequent values for the threshold register 66 will be entered in accordance with the length of previous data blocks entered in the data buffer RAM 40 as reported to the microprocessor 29.

The compare circuit 60 compares the address of the load counter 58 with the value contained in the threshold register 66. When there is coincidence between these two quantities, a THRESHOLD READY flip-flop 64 will be set. OR gate 62 is provided to set the THRESHOLD READY flip-flop 64 in the event that the data block ends before the threshold is reached. A decoded DATA END command from I/O adapter interface 30 will provide the second input to OR gate 62. Therefore, on occurrence of either of these results, the THRESHOLD READY flip-flop 64 is set, permitting unloading of the data buffer RAM 40 to begin once the channel has been reacquired.

Additionally, there is a READ OP/WRITE OP control line 31 which will enable the load control and unload control to either begin a read or write operation upon command of the microprocessor 29.

The channel control bus 37, channel connect line 45, READ OP-WRITE OP line 31 and buffer reset 33 will be explained with respect to a particular protocol used for the channel data bus 51.

The microprocessor interface 27 will generate commands and decode commands for the channel control bus 37 as well as device control bus 35. Additionally, loading of the threshold register 66 and reading of the actual length register 55, THRESHOLD READY flip-flop 64, large block flip-flop 59 and channel rate switches 56 are carried out by the microprocessor 29.

The microprocessor 29 will perform the decoding and channel interface protocol interface assignments, as well as the device control protocol assignments. Additionally, ROM storage 28 provides the look-up table from which the value of a new threshold may be read.

The actual length register 55 will contain the highest address which was accessed by the unload counter 54. The actual length register 55 will therefore identify the length of the data block which has been unloaded from the data buffer RAM 40.

The operation of FIG. 3 will now be described more particularly with respect to the timing diagrams of FIG. 4.

The channel protocol for the channel data bus 51 is arranged such that when channel access is available, a command is transmitted from the channel control over channel control bus 47 to the channel adapter interface 46. The channel control bus 37 will identify the OPERATIONAL IN command as requesting access to the input/output device. As the data buffer has not accumulated data to transmit to the channel data bus 51, the STATUS IN line is raised in the channel adapter interface 46. This results in NOT READY status previously sent over the channel control bus 37, being forwarded through the channel adapter 46 to the channel control 47. Thus, the unavailability of data will be acknowledged to the channel data bus controller, permitting it to access other input/output devices for data.

Figure 4:
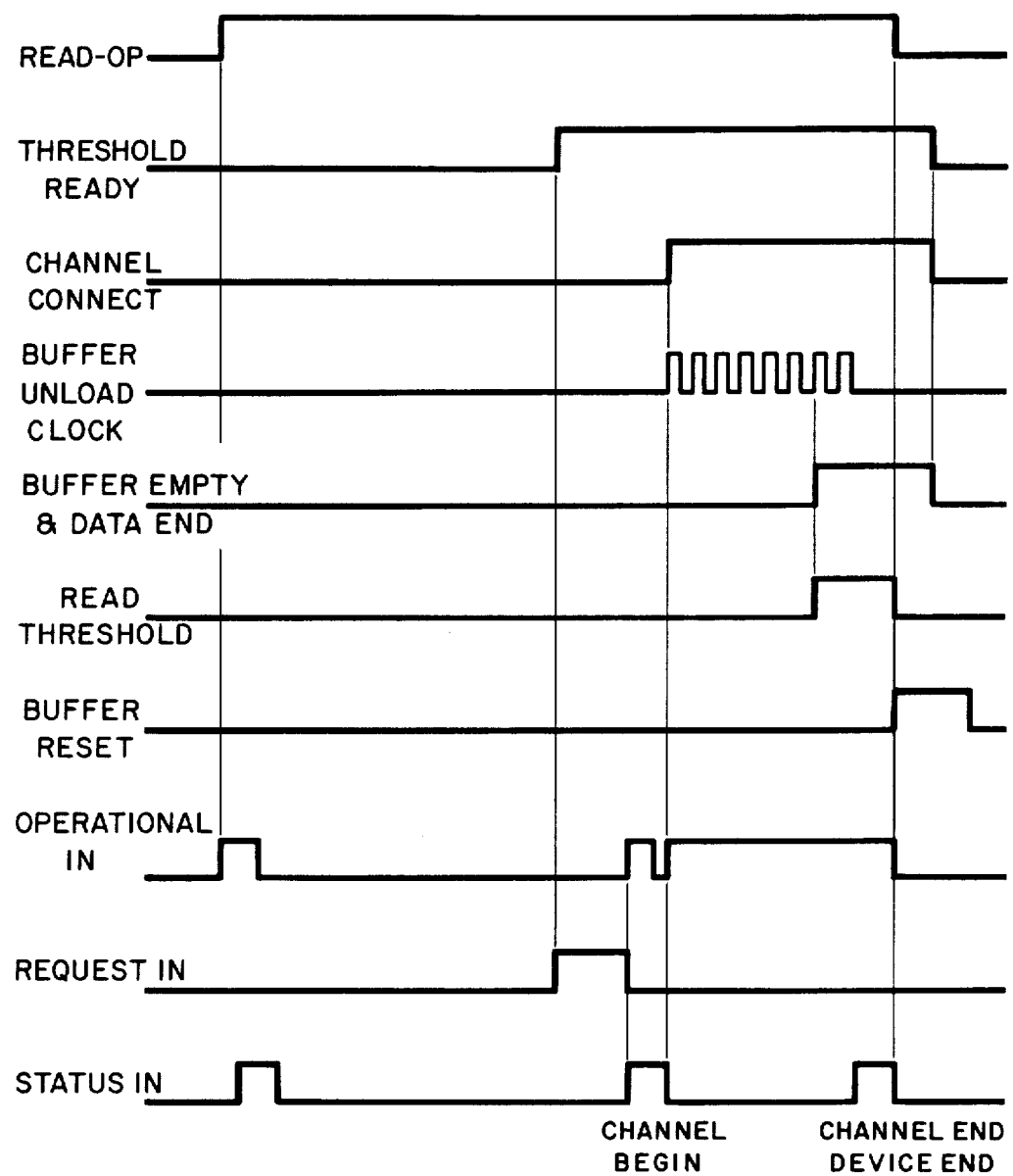
FIG. 4 is a timing diagram illustrating the operating sequence of the apparatus of FIG. 3.

The receipt of the OPERATIONAL IN channel request will result in the microprocessor 29 raising the READ OP/WRITE OP line 31 as shown in FIG. 4. This will also send a READ OP command to device control bus 35 to begin the transfer of data from the input/output device. During the READ OP time as identified by FIG. 4, the data will be transferred from the input/output device into the data buffer RAM 40.

When the READ OP is active, data is sent byte by byte from the input/output device over the device data bus 34. The I/O device adapter interface 30 generates the handshake controls 36 which will indicate the presence of each data byte for loading into data buffer RAM 40 to load control 49. Each data byte loaded in the data buffer RAM will result in the load counter 58 being incremented, until the entire length of the data block is loaded into the data buffer RAM 40.

If the load counter 58 is incremented to a level identified in the threshold register 66, the compare circuit 60 will set the THRESHOLD READY flip-flop 64. Alternatively, the END OF DATA BLOCK signal from the I/O device adapter interface 30 will also set this flip-flop.

The THRESHOLD READY flip-flop 64, when set as shown in FIG. 4, marks the beginning of a request for the channel to begin reading the data buffer RAM 40. The REQUEST IN signal, shown as assuming a high logic state when the THRESHOLD READY state is also high, is a command sent over the channel control bus 37 for access to the channel. The next OPERATIONAL IN signal, decoded from the channel control bus 37, will result in the channel being connected by the channel adapter interface 46, to the data bus 41, rather than being excused as was the case when the first OPERATIONAL IN command was decoded.

Having thus received channel connection, channel connect line 45 goes high, enabling the unload control 48 to begin unloading from data buffer RAM 40 the accumulated I/O device data.

The buffer unload clock, which is preferably synchronized to the channel clock is used to increment the unload counter 54 from an initial address identifying the first data byte received in the buffer to a maximum data buffer RAM 40 address, at a rate corresponding to the maximum channel data transfer rate. Each time the unload control 48 increments the unload counter 54, an unload strobe is generated to transfer data from the data buffer RAM 40 to the transceiver 43 for reading by the channel data bus 51. The LOAD control 49 and UNLOAD control 48 will be time shared enabled to permit the accumulation of data in the data buffer RAM 40 from data bus 39 as well as read from the data buffer RAM 40 the accumulated data at a faster rate than is being loaded in the data buffer RAM 40. When the data buffer is empty, and a DATA END signal has been received indicating the entire block of data has been transferred from the input/output device, the buffer reset is set high for resetting all the registers and flip-flops of FIG. 3 to permit the next OPERATIONAL IN SEQUENCE to be processed.

In the timing diagram of FIG. 4, it was assumed that the data WRITE sequence ended at the same time as the READ sequence as indicated by the BUFFER EMPTY and END OF DATA signals. Had the BUFFER EMPTY signal occurred before the END OF DATA signal from the I/O device interface, the UNLOAD control clock rate would be reduced to the data transfer rate of the input/output device. The adaptive nature of the system for continually revising the threshold, however, will tend to reduce the time of occurrence of a premature BUFFER EMPTY signal.

The actual length of data which has been read from the data buffer RAM 40 will be contained in the actual length register 55. This register accumulates a count proportional to the unload counter 54 count reached during the READ cycle. The actual length register 55 is read by the microprocessor interface 27 and microprocessor 29 as soon as the buffer empty and the data end detection has occurred. Thus, data is available to the microprocessor 29 indicating the total length of the data block transferred to determine in subsequent steps the next value of the threshold to be stored in threshold register 66.

Microprocessor 27 will have available the device data transfer rate, either sent as a command over the device control bus 35 or otherwise preprogrammed as the data buffer will in all likelihood remain permanently connected to the particular input/output device. The channel data rate switches 56 will be selectable to permit the optimum channel data bus 51 data transfer rate to be indicated to the microprocessor 29. The microprocessor 29, knowing the channel data rate or Rc, the input/output device data rate Rd and the last block length to be processed as identified by the actual length register 55 contents, will compute a new threshold for the threshold register 66. As was indicated earlier, the microprocessor 29 may select the largest of the last five or the largest of all block lengths received to date to determine the new threshold register 66 contents.

Additional to this function, a large block flip-flop 59 is provided which is connected to the load counter 58. Load counter 58 includes a carry bit which, when the data buffer RAM 40 has been filled to capacity, will set the flip-flop 59. The large block flip-flop 59 will indicate to the microprocessor that it is to disregard the contents of the actual length register 55. In the unusual event that the data buffer RAM 40 receives a data block of length greater than its storage capacity, the load counter 58 will wrap around, i.e., begin at its beginning address with the load control 49 loading the excess data to the data buffer RAM 40. As data in these lower order addresses will have been unloaded in normal operation by the commencement of the UNLOAD operation, over-writing of residual data is prevented. The large block flip-flop 59 will prevent an erroneous reading of the actual length register 55 which will not register the true length of the large data block.

Referring now to FIG. 5, there is shown a chart of the organization of the ROM 28. ROM 28 will contain readout threshold tables. Depending on the six (6) higher order address bits registered in the actual length register 55, a new threshold is identified. When decoding less than the full number of address bits present on address bus 59, it is possible to indicate within a certain granularity the appropriate threshold. As shown in the table, the actual threshold used is a compromise between the indicated range of optimum threshold calculated in accordance with the foregoing formula. Thus, by conveniently going to the look-up table stored in ROM 28, using as the address lines to the ROM the highest order bits of the actual length register 55, a new threshold level can be outputted to the threshold register 66. This threshold level identifies a byte number to begin unloading. The designation K represents 1024.

Thus, there has been described with a specific protocol for a channel data bus 51 a data buffer which will transfer data from the input/output device to the channel data bus which minimizes device data transfer degradation, without compromising the channel data bus such that the channel capacity is degraded.

Having thus described our invention, what we claim as new, and desire to secure by Letters Patent is:

1. In a data processing system having at least one peripheral data input/output device, and a data channel having a channel data transfer rate substantially greater than a data transfer rate of said peripheral input/output device, a data buffer interface comprising:
   a buffer memory for receiving data of a plurality of block lengths from said peripheral device, and transferring said data to said data channel;
   a threshold register for storing the identity of a data word within said data block which indicates the start of a transfer cycle for transferring data from said buffer memory to said data channel;
   a load control for loading each data word sequentially received from said peripheral device into said buffer memory;
   an unload control connected to unload each data word stored in said buffer memory at a rate determined by said data channel data transfer rate;
   a comparator means connected to enable said unload control when said load control loads a data word identified by said threshold register into said buffer memory, whereby data transfer to said channel is initiated before said buffer memory has completely filled; and
   a microprocessor connected to supply said threshold register with the identity of said data word which indicates the start of said transfer cycle, said microprocessor connected to receive a signal from said unload control for determining a new threshold identity for subsequent blocks of data based upon the length of a previous block of data transferred from said buffer memory to said channel.

2. The buffer interface of claim 1 wherein said microprocessor is programmed to calculate a threshold identity which will permit said buffer memory to be unloaded at a data transfer rate corresponding to said channel data transfer rate while loading data at a transfer rate determined by said peripheral device input/output data transfer rate such that loading and unloading to and from said buffer memory are completed at substantially the same time.

3. The buffer interface of claim 2 wherein said microprocessor is programmed to release said channel until said data word identified by said threshold register has been received by said buffer memory.

4. The buffer interface of claim 3 wherein said microprocessor is programmed to establish a new threshold identity based on a previous data block length transferred to said buffer memory.

* * * * *